(No Model.)
P. G. EMERY.
BRAKE HANDLE.
No. 531,612. Patented Dec. 25, 1894.
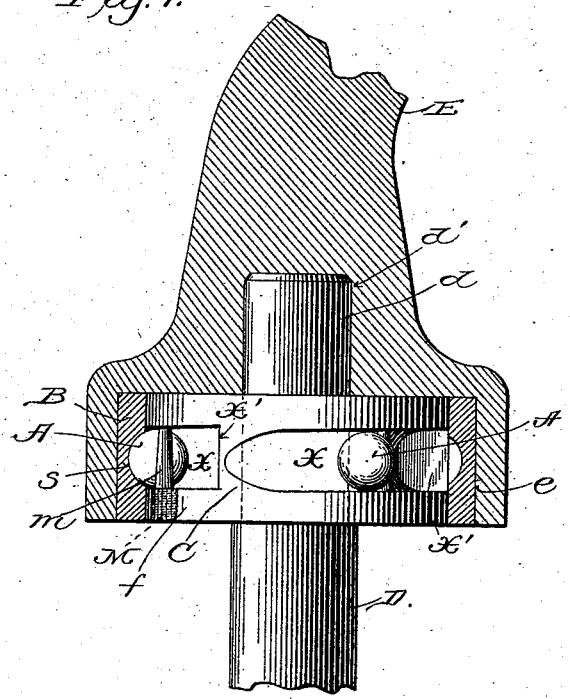
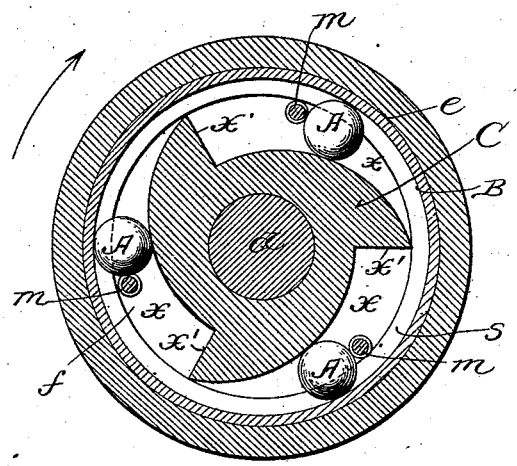
Witnesses:
Harry D. Rohrer.
Herbert Bradley.
Inventor:
Plato G. Emery
By [attorneys]

UNITED STATES PATENT OFFICE.

PLATO G. EMERY, OF CHICAGO, ILLINOIS, ASSIGNOR TO THE ADAMS & WEST-LAKE COMPANY, OF ILLINOIS.

BRAKE-HANDLE.

SPECIFICATION forming part of Letters Patent No. 531,612, dated December 25, 1894.

Application filed July 25, 1894. Serial No. 518,571. (No model.)

*To all whom it may concern:*

Be it known that I, PLATO G. EMERY, of the city of Chicago, in the county of Cook and State of Illinois, have invented certain new and useful Improvements in Brake-Handles, of which the following is a specification, reference being had to the accompanying drawings and to the letters of reference marked thereon.

My invention relates to a brake handle for use on street or other cars, which, when rotated in one direction, is operative upon the brake staff or rod, or some part secured rigidly thereto, to impart rotary motion to said staff or rod, and thereupon cause the brakes to be set; but which, when given rotation in the opposite direction, shall freely revolve upon or around the brake staff without turning the latter.

In the accompanying drawings, Figure 1 is a view, chiefly in vertical section, of my invention as applied to the upper end of a brake staff. Fig. 2 is a plan, chiefly in section, showing the invention.

Similar letters of reference indicate similar parts in each figure.

D represents the brake staff or rod upon which the brake chain is wound.

C is a carrier or hub, preferably of steel, rigidly secured to or upon the upper end of the brake staff, the reduced portion $d$ of which projects above the carrier C. The carrier C may, however, be integral with the brake staff. The carrier is provided with slots or depressions $x$, the circularly grooved faces of which stand eccentrically with reference to the circumference of the carrier C, which is concentric with the axis of the brake staff. The slots or depressions $x$ are slightly inclined with reference to the horizontal line, or one drawn at a right angle to the vertical center line of the brake staff, as shown in Fig. 1. The inner end of each slot or depression $x$ forms a shoulder $x'$, preferably arranged radially with respect to the axis of the brake staff.

E is the brake handle, the lower portion of which is provided with a socket $e$, and an upper bore or bearing $d'$, in which bore or bearing the upper reduced portion of the brake staff D fits. The socket $e$ of the brake handle E is by preference fitted with a steel bushing or shell B, having an inner annular circularly grooved surface $s$.

A, A, A, are steel balls which, when the several parts of the device are assembled, rest and play within ways or races formed by the slots or depressions $x$ and the inner curved annular surface $s$ of the shell B. Screws M enter the lower flange or circumferential portion $f$ of the carrier C, having upper tapered ends $m$ which project across the slots or depressions $x$ and tend to maintain the balls A close up to the point of effective action, and thus avoid lost motion, as will be more fully hereinafter explained.

The annular grooved surface $s$ of the shell B serves a double purpose, viz: of affording greater area for the contact of the balls A, and, secondly, of preventing the handle E from removal during operation.

The various parts being assembled, or fitted together as shown, the balls A rest normally within the races formed, as aforesaid, by the slots or depressions $x$ of the carrier C and the annular circularly grooved surface $s$ of the shell B; and are kept from rolling to the widest portion of the slots or depressions $x$, and against the shoulders $x'$ thereof, by the intervention of the upper tapered portions $m$ of the screws M.

It will be seen that the projection of the balls A within the grooved annular surface $s$ of the shell B, prevents the detachment of the handle E from the brake staff, except when, by the removal of the screws M, the balls are permitted to roll back against the shoulders $x'$ at which time the balls, having escaped from said grooved surface $s$, the handle will be free to be slipped from the carrier C, and from the reduced portion $b$ of the brake staff.

In operation, the balls A being normally retained near or against the tapered upper ends $m$ of the screws M, the brake handle E is free to be turned to the left around the brake staff as an axis without applying the brakes. When it is desired to put on the brakes, the handle E must be moved to the right, as indicated by the arrow in Fig. 2, when the balls A, tending by gravity toward the narrower ends of the slots or depressions $x$, will jam tightly between the shell B, and the carrier C, and the latter being rigidly attached to the brake staff, or forming a part thereof, will impart to it the rotary movement given to the handle, and thus wind up the brake chain. To reverse the brakes, the brake staff D must be released and permitted to rotate in the opposite direction, when the rotation of the carrier C will roll the balls A in the direction toward the wider ends of the slots or depressions $x$, whereby the grip of the balls on the carrier C will be released. The entire travel of the balls A, between the point of grip and the point of release, is almost infinitesimal, and the degree of lost motion in gripping thus as a consequence reduced to the minimum. The slight inclination given to the slots or depressions $x$ is provided so that when the brake staff is in its normal or ineffective position, the balls A will tend to approach the narrower ends of the slots or depressions, ready to be engaged with or wedged between the shell B and the carrier C when the handle is to be moved to the right to put on brakes.

This invention has been found to be strong and simple, and an effective device for the purpose mentioned, while its cost is comparatively small.

Certain details of construction may be changed without departing from the main features of the invention. Thus, while I prefer that the slots or depressions $x$ shall be slightly inclined in order to prevent unnecessary play or lost motion in the initial movement of the brake staff for effective braking, said slots or depressions may be arranged horizontally with respect to the axis of the brake staff. While the shell B is by preference made of hardened steel and the handle proper E of composition metal, I do not limit myself to a combination in which said shell is included; as by giving to the socket of the handle E a suitable hardness, the shell may be omitted. Neither do I restrict myself to the number of slots or depressions $x$, nor, consequently, to the number of balls A, as any suitable number may be employed; but Having described my invention, I claim—

1. In combination with a brake handle having a lower socket provided with an inner grooved annular surface, and a brake staff, a carrier having a series of slots or depressions eccentric to the axis of said brake staff, while its circumference is concentric therewith, and a series of balls confined within races formed by the said slots or depressions and the grooved annular surface of said handle socket, substantially as set forth.

2. In combination with a brake handle having a lower socket provided with an inner grooved annular surface, a brake staff and a carrier having a series of slots or depressions eccentrically arranged with respect to the axis of said brake staff and inclined from a line horizontal with said axis, a series of balls confined within races formed by said slots or depressions and the grooved annular surface of said handle socket, substantially as set forth.

3. In combination with a brake handle having a lower socket formed with an inner grooved annular surface, and a brake staff, a carrier secured to or forming a part of said brake staff and having slots or depressions eccentrically arranged with reference to the axis thereof, balls adapted to ride or bind between said carrier and said handle socket, and devices for maintaining said balls closely to the point of effective action, substantially as set forth.

4. In combination with a brake handle having a lower socket formed with an inner grooved annular surface, a brake staff, a carrier fixed thereto having circularly grooved surfaces eccentric to the axis of said brake staff, and balls confined and adapted to bind between said carrier and socket, during the rotation of said handle in one direction, and to be released during its rotation in the opposite direction, substantially as set forth.

In testimony whereof I hereto set my hand and seal.

PLATO G. EMERY. [L. S.]

Witnesses:
WM. S. HAMM,
G. HENRY GILS.